United States Patent [19]

Green et al.

[11] 4,068,532
[45] Jan. 17, 1978

[54] ELECTRONIC WHEEL BALANCER APPARATUS AND METHOD

[75] Inventors: Bernard J. Green, Bristol, Tenn.; Jerome J. Chorosevic, Bristol, Va.

[73] Assignee: Plumbium Manufacturing Corporation, Bristol, Tenn.

[21] Appl. No.: 753,094

[22] Filed: Dec. 21, 1976

[51] Int. Cl.² ........................................ G01M 1/08
[52] U.S. Cl. ................................................. 73/462
[58] Field of Search .................. 73/462, 483, 487; 235/151.3

[56] References Cited

U.S. PATENT DOCUMENTS

| | | | |
|---|---|---|---|
| 3,272,015 | 9/1966 | Behm | 73/487 |
| 3,550,455 | 12/1970 | Green et al. | 73/483 |

Primary Examiner—James J. Gill
Attorney, Agent, or Firm—Francis A. Keegan

[57] ABSTRACT

An electronic apparatus and a method for dynamically counter-balancing vehicle wheels with balance weights of a single, pre-selected mass. The apparatus is characterized by a device for determining the magnitude and the location on the inside and outside rim flanges of the subject wheel at which a weight of the determined magnitude could be placed to provide the moment required to achieve a counter-balanced condition, an arithmetic unit for operating upon said position and magnitude data to compute the positions on the inside and outside rim flanges at which one each of said balance weights should be placed to provide a resultant counter-balancing moment equal to that required to balance the wheel when using only a single weight of the determined magnitude on each rim flange, and a means for visually displaying the positions on the rim flanges at which such balance weights are to be affixed in order to balance the wheel. The method relates to the process to be implemented on the described or other suitable apparatus.

22 Claims, 6 Drawing Figures

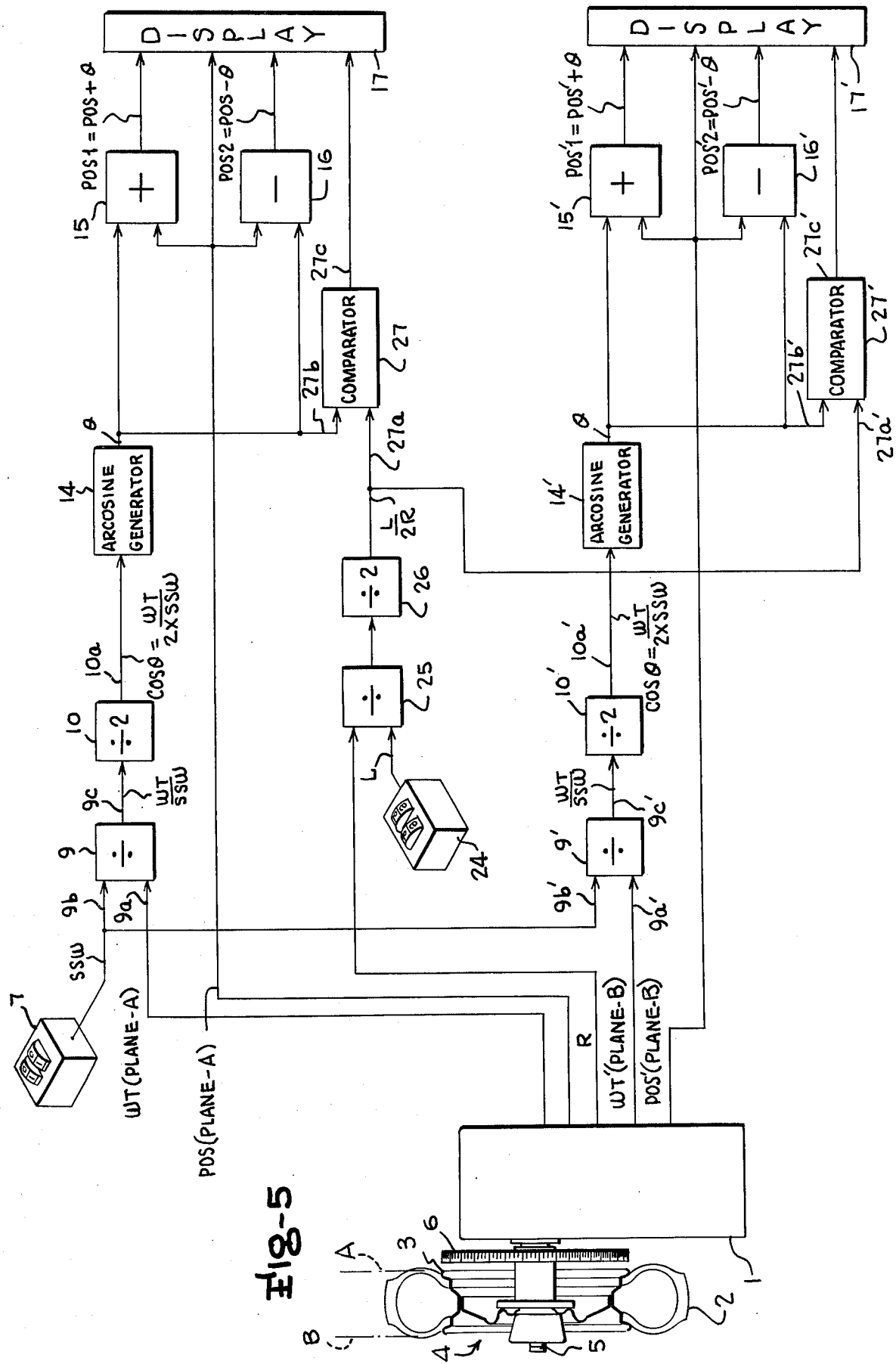

ELECTRONIC WHEEL BALANCER APPARATUS AND METHOD

BACKGROUND OF THE INVENTION

1. Field of the Invention

This invention relates to the field of balancing of vehicle wheels and, more particularly, to an electronic apparatus and a method suitable for achieving a dynamic balance of said vehicle wheels while using balance weights of a single, pre-selected mass.

2. Description of the Prior Art

As explained in U.S. Pat. No. 3,550,455 to Green et al., it is possible to balance vehicle wheels, for example, conventional automobile wheels, by using balance weights all of which are of a single, pre-selected mass. The mass of said balance weights may be statistically optimized, according to the teachings of the Green, et al. patent, so that one size weight can be used for counter-balancing a wide variety of wheel out-of-balance conditions. The method disclosed in that patent, however, is limited to the use of a conventional light spot or bubble-type wheel balancing apparatus for achieving a static balance condition. That earlier method for using balance weights of a single, pre-selected mass for wheel counter-balancing is further limited in that it requires a user or operator to manually move the balance weights along the wheel rim, in successive trial and error attempts, to approach a position at which a balance is achieved.

While the previously discussed patented method for using balance weights of a pre-selected mass for wheel balancing resulted in a substantial reduction in the cost of inventory and labor required for static wheel balancing operations as compared with prior techniques, our present apparatus and method is superior still, as it results in a dynamic wheel balance with less operator activity being required. Also, that patented method, while having achieved very wide commercial success, is subject to the introduction of operator-caused error relating to both the trial-and-error nature of the method and imperfect practice of the method by operators. The apparatus and method here described provide for highly accurate, automatic determination of the positions where balance weights should be placed, limiting operator involvement to merely setting parameters and attaching the weights. Thus, our present invention provides for both a quicker, more accurate determination of the positions at which balance weights should be placed and a superior dynamic, rather than static-only, balance.

SUMMARY OF THE INVENTION

The invention which we describe herein is usable for the purpose of dynamically balancing vehicle wheels with a plurality of balance weights of a single, pre-selected mass.

Accordingly, it is a principal object of this invention to provide an apparatus and a method usable for the purpose of dynamically counter-balancing vehicle wheels, while employing balance weights of only a single, pre-selected mass.

An additional object of this invention is to provide an apparatus and method for counter-balancing vehicle wheels both dynamically and statically in a single operation.

It is another object of this invention that such apparatus provide a visual indication of the positions at which balance weights of a single, pre-selected mass may be placed on the rim flanges of a conventional vehicle wheel in order to achieve a dynamically counter-balanced condition for said vehicle wheel.

Our invention comprises an apparatus and method capable of achieving these objectives. Briefly, we have provided means for rotating the wheel to be balanced, electro-mechanical means for sensing, for each rim flange plane, the magnitude and the location on the rim flange at which a weight of the sensed magnitude could be placed to provide the counter-balancing moment required to correct the out-of-balance condition in each of said rim flange planes and for producing electrical representations of said magnitude and location, means for producing an electrical representation of the mass of said balance weights of the pre-selected mass, a divider circuit for producing a quotient signal representing the magnitude of the weight sensed to be required in the rim flange plane divided by twice the magnitude of a balance weight of the pre-selected mass, said quotient signal representing the cosine of the angular displacements at which said balance weights should be placed relative to the location in each plane at which said sensed weight would provide a balanced condition, means for obtaining the angles of which said cosines are representative, and a visual display means for displaying the positions at which said balance weights should be placed. Dynamic balancing is provided by applying the aforesaid balancing system to both the inside and outside rim flanges, independently of each other.

Alternative embodiments of our invention relate to the situation where two balance weights of the pre-selected size are insufficient to establish a balanced condition in either plane. These alternatives make provision for the placement of a third one of said balance weights at the location on the pertinent rim flange at which it is indicated that a weight of the determined magnitude should be placed.

DESCRIPTION OF THE FIGURES

FIG. 5 is a combination diagrammatic, block-function diagram of a second alternative embodiment of our electronic wheel balancer.

DESCRIPTION OF A PREFERRED EMBODIMENT

Figure 1:
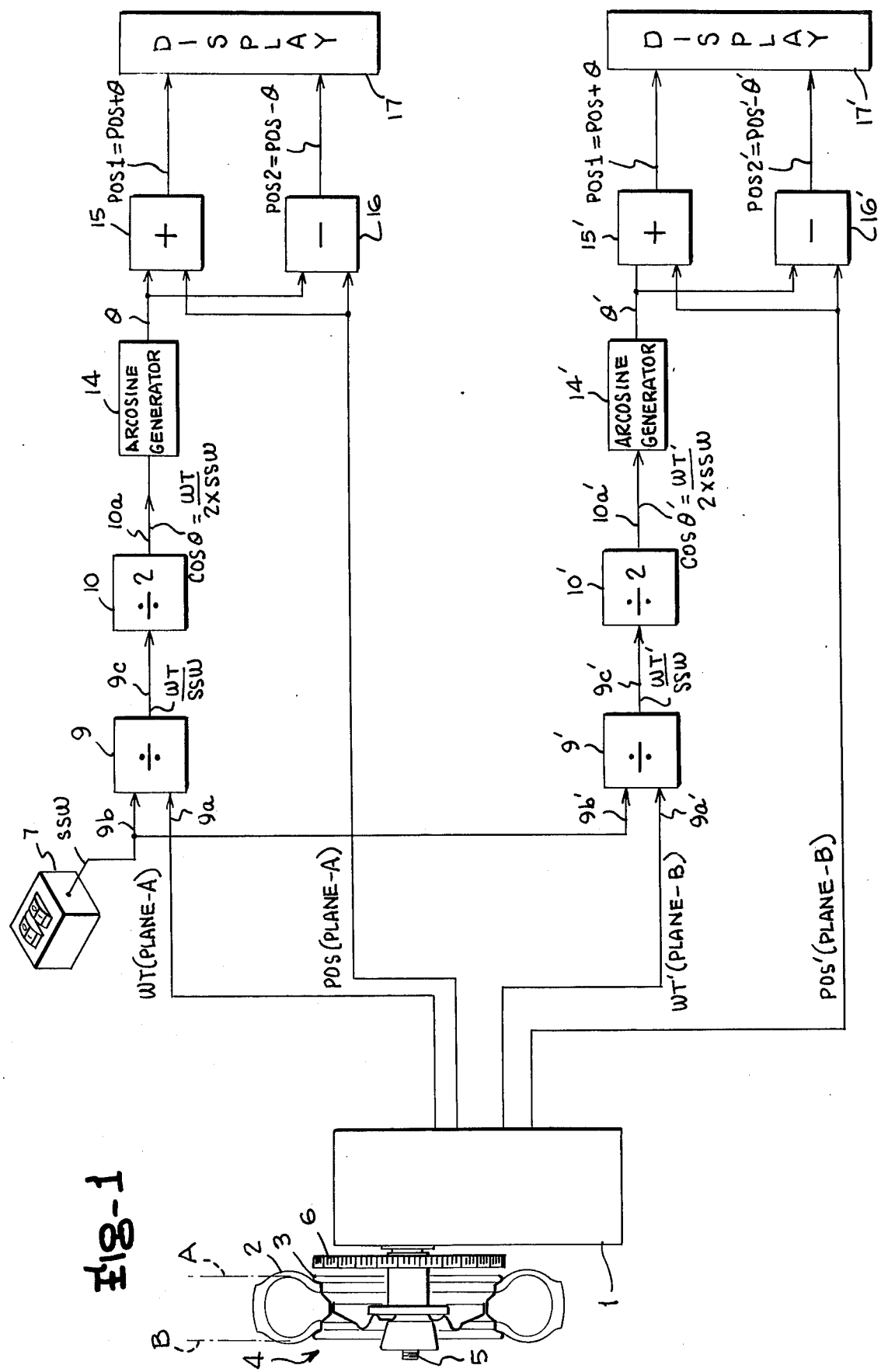
FIG. 1 is a combination diagrammatic, block-function diagram of our basic electronic wheel balancer.

FIG. 1 illustrates a preferred embodiment of our wheel balancing system. Sensor unit 1 comprises an electro-mechanical apparatus upon which the wheel to be balanced may be mounted and rotated, generally about a horizontal axis. A suitable apparatus for this element would be one such as shown in U.S. Pat. No. 3,732,737, issued May 15, 1973 to Brian Michael Forster. Sensor unit 1 provides four electrical output signals. The first of these signals, WT, represents the magnitude of a weight which, if placed at the proper angular location along the first or inner wheel rim flange defining a plane A, will develop a counter-balancing moment needed to dynamically balance the wheel in said plane; the second, POS, the angular location on said wheel rim flange at which said weight should be located to deveoop a counter-balancing moment in the direction required in order to produce a condition of dynamic balance in plane A. The third and fourth output signals of sensor unit 1 provide the same data relative to a second plane B defined by the other or outer wheel rim flange. All of the electrical signals herein may be either analog or digital, as desired. However, for reasons of economy, reliability, and simplicity of design, we have found digital techniques to be preferable both serial and parallel processing being suitable.

In the case of conventional vehicle wheels, the balancing operation is performed upon the combination of a tire 2 and a rim 3, the combination comprising a wheel assembly 4. In accordance with standard practices established in the prior art, sensor unit 1 is provided with a spindle 5, rotatable about a generally horizontal axis, and wheel 4 is manually placed by the operator on said spindle prior to the electronic wheel balancer being activated.

A gauge member or scale 6 is provided, the gauge member having graduated markings fixed in angular orientation relative to spindle 5. By generating signal POS synchronously relative to spindle 5, a one-to-one correspondence may be obtained between values of POS and angular positions on wheel rim 3 as indicated on gauge member 6. While the graduated markings on gauge member 6 can be as closely spaced as desired, it has been found that resolution to 5° of arc is sufficient for obtaining a satisfactory balance with conventional vehicle wheels, in view of the physical dimensions of available weights. A gauge member provided with 72 evenly spaced radial positions will provide this resolution. Thus, two digits will suffice for displaying the weight positions. Of course, the actual choice of resolution is up to the user, and is not intended herein as a limiting feature.

The mass of the balance weights may either be preset or initially set by the operator. Means such as a thumbwheel switch 7, assuming a digital system, or a potentiometer, assuming an analog system, may be used to allow the operator to set balance weight mass. Thumbwheel switches 7 provide an electrical signal, SSW, representative of the mass of the weights to be employed. Notwithstanding the flexibility provided by a thumbwheel switch, it may be desirable, in order to eliminate one source of operator error, that means 7 be capable of being preset, whereby the operator cannot freely change the value of signal SSW. Alternatively some flexiblity may be added to the system without giving rise to a significant source of operator error by allowing the operator to select from among a multiplicity of pre-selected balance weight masses, as for example, by incorporating in means 7 a multiple position switch.

Divider 9 receives signal WT as a first input 9a and signal SSW, as a second input 9b, divides the former by the latter, and provides an output signal 9c representing the quotient WT/SSW. The latter signal is halved in value by halving circuit 10, which in turn produces an output signal 10a representing the quantity $COS\ \theta = WT/2 \times SWW$.

Figure 2:
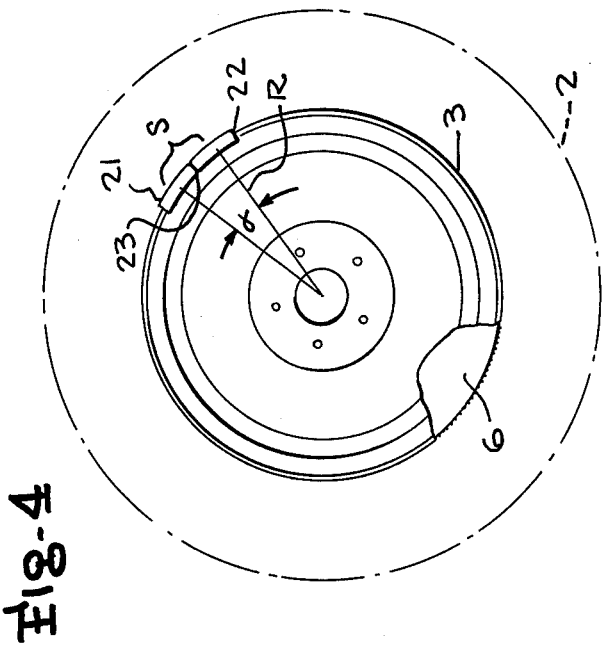
FIG. 2 is a top view of a wheel rim showing the proper placement of balance weights on one flange of the rim, according to our invention.

With reference to FIG. 2, it will be observed that if weights are to be placed on the wheel rim symmetrically about the postion 11 represented by signal POS, the quotient signal COS $\theta$ represents the cosine of the angular displacement R on either side of the position corresponding to POS at which one each of the balance weights should be affixed to the wheel rim flange to obtain a balanced condition. Thus, in order to achieve a visual indication of the positions 12 and 13 at which the operator should place said balance weights, the signal COS $\theta$ is first provided to arcosine generator 14. Arcosine generator 14, may, for example, be a read-only-memory (ROM) in which an arcosine table is stored, together with control logic for providing access to the ROM and obtaining as output therefrom an electrical signal $\theta$. Adder 15 and subtractor 16 respectively add and subtract the $\theta$ signal from the POS signal, to generate corresponding signals POS1 and POS2. Signals POS1 and POS2 represent the positions in plane A at which a balance weight of the pre-selected mass should be attached to the wheel rim flange. These may be displayed by any display means 17 as would be considered convenient. For a digital system, display means 17 might be a direct numerical display; while for an analog system, a meter might be used. Other displays are, of course, possible, such as a series of lights incrementally spaced circumferentially around the wheel, so that when the wheel is stopped those lights corresponding to the positions POS1 and POS2 could be illuminated to show the location for placement of the balance weights.

Since there can be situations in which one balance weight at each of positions 12 and 13 will not be adequate to balance the subject wheel, WT may, at times, exceed twice the mass of a balance weight. This will, of course, cause COS $\theta$ to exceed unity. Arcosine generator 14 is capable of detecting this event and providing an output signal $\theta$ which will indicate to the operator that the signals displayed at POS1 and POS2 may not be relied upon. With the addition of a third balance weight, however, said third weight being placed at the position corresponding to position signal POS, it has been found that there are very few out of balance conditions which cannot be properly compensated. Accordingly, we have invented two alternative embodiments of our basic invention in which provision is made for using up to three weights of the pre-selected mass in each plane.

Figure 3:
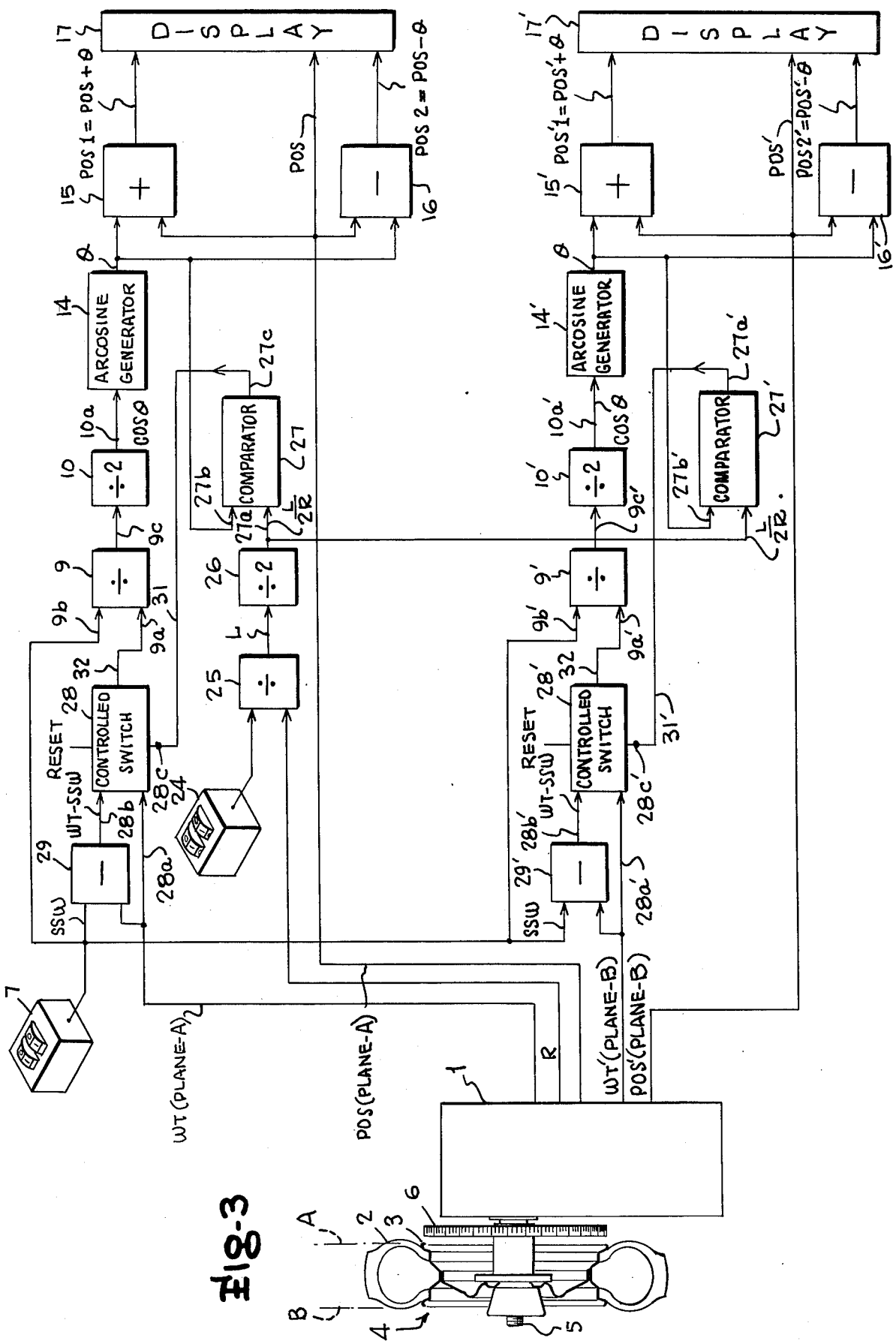
FIG. 3 is a combination diagrammatic, block-function diagram of a first alternative embodiment of our electronic wheel balancer.

With reference to FIG. 3, a first alternative embodiment is shown. In this alternative, means are provided for determining whether two balance weights will be sufficient to achieve a balanced condition. In the event that two balance weights will not be adequate, a visual indication is given to the operator that a third balance weight should be placed at the position represented by POS, and the apparatus then calculates the positions at which the two other balance weights should be placed, assuming the third weight will be placed. The positions for the two balance weights which are to be placed on either side of the central position represented by POS are located by first subtracting the mass of a balance weight from the magnitude of the weight sensed to be required to develop the appropriate counter-balancing moment, to provide an adjusted moment requirement, WT-SSW, and processing the adjusted moment requirement as above.

Figure 4:
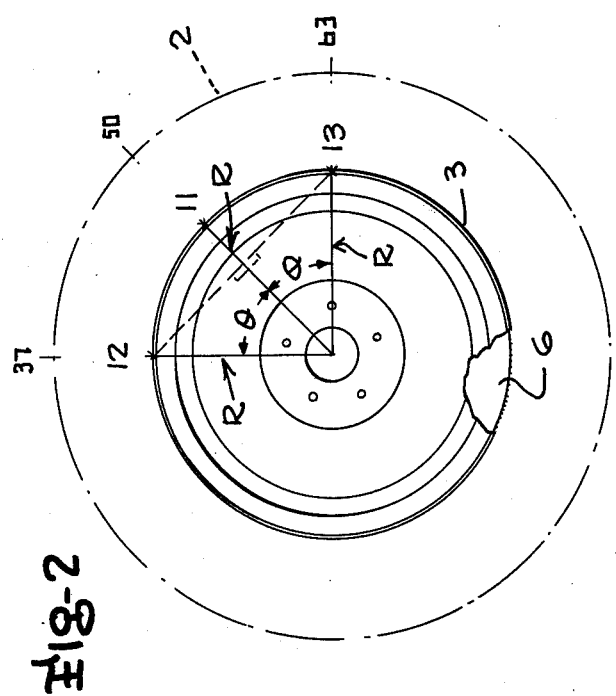
FIG. 4 is a top view of a wheel rim showing two closely spaced balance weights on the top rim flange.

The limiting factor controlling whether two essentially identical weights of the same known mass can adequately counter-balance a wheel is the physical size of the weights—specifically, the arc length such weights require on the subject rim flange. In moving the two balance weights 21 and 22 closer together, there will be a point at which these weights will be in end-to-end contact, as illustrated in FIG. 4. At such point, the centers of the weights are separated by an arc length S, which is related to the angle $\alpha$ subtended by the radii to the centers of the weights according to the formula $\alpha = S/R$, where R is the radius to the rim flange. For the small values of arc length typical of commercially available wheel balancing weights, the length L of each weight is approximately equal to S. If the position 23 at which the two weights 21 and 22 touch is the flange position corresponding to POS, then the mid points of weights 21 and 22 cannot be placed any closer to that position than about L/2 Rradiants.

Means 24 are provided, therefore, for either pre-setting or permitting the operator to initially set the length L of the balance weights to be used. Such means may, in the case of a digital system, be thumbwheel switches. A signal representing radius R may be made available from sensor unit 1, since that is an operator-set parameter and is internally present in sensor unit 1. Divider 25 receives both the L and R signals and provide a signal representing quotient L/R as its output; this quotient signal is fed to halving circuit 26, which produces at its output a signal representing L/2R. The output of halving circuit 26 is connected to the first input 27a of comparator 27, while the output of arcosine generator 14 is connected to the second input 27b of comparator 27. The output signal 27c of comparator 27 is connected to the control signal input 28c of condition responsive controlled switch 28. Condition responsive controlled switch 28 has two signal inputs 28a and 28b, the first receiving the signal WT and the second, the signal WT-SSW, which signal is provided by subtractor 29. The switch 28 is a two-state switch responsive to the control signal 27c provided on control line 31. When the output of comparator 27 indicates that $\theta$ is less than or equal to L/2R, it provides a control signal 27c which causes controlled switch 28, in response, to connect its second input directly to its output. Switch 28 is latched in this position until being reset prior to the next balancing operation. Resetting switch 28 results in the first input of said switch being connected to its output. When the output of comparator 27 indicates that $\theta$ is greater than L/2R, it causes controlled switch 28, in response, to connect its first input directly to its output. The output 32 of controlled switch 28 is connected to input 9a of divider 9, the operation of the remainder of the system being as described above.

A second alternative embodiment is shown in FIG. 5. In this alternative, the output 27c of comparator 27 is connected to display 17 for signalling the operator when $\theta$ is less than or equal to L/2R. Upon the occurrence of such signal, the operation can stop the apparatus, install a balance weight at the position indicated by the display showing the POS signal and then restart the apparatus. Our balancer will then proceed as above described to display the POS1 and POS2 signals defining the positions on the rim flange where additional balance weights should be placed.

Some modifications of these alternative embodiments may be made without materially changing the functioning of our apparatus or method. For example, it is obvious that the inputs to comparator 27 could be signals representing the cosines (or other functions) of the angles $\theta$ and L/2R, rather than the angles themselves. Were that change made, it would, of course, be necessary to correspondingly change the operation of controlled switch 28; controlled switch 28 should still respond to the relative magnitudes of the quantities $\theta$ and L/2R as described above. As a further modification, it is also apparent that the quantity L/2R need not be separately calculated for each operation of the apparatus if some sacrifice in the efficient use of weights is acceptable. The apparatus described in the alternative embodiments will function properly so long as the smaller value of $\theta$ for which two weights are used is no smaller than L/2R. Therefore, a fixed value may be ascribed to the quantity L/2R, and if such fixed value is chosen to be just large enough to account for the largest weight which might be used (on the smallest rim expected), only a little efficiency is lost.

Figure 6:
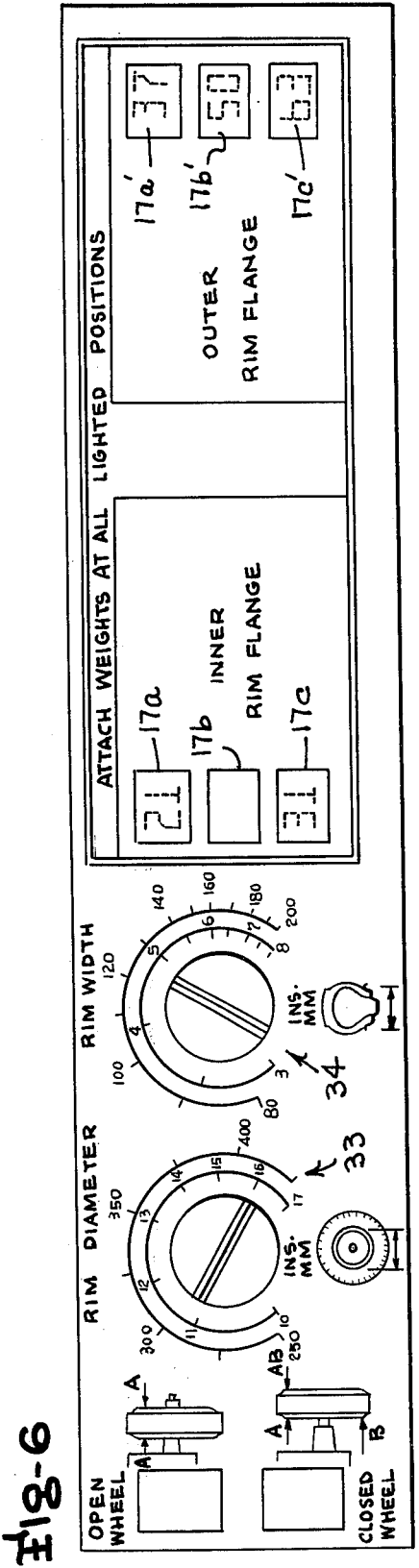
FIG. 6 is a front elevation of an arrangement for an operator's panel for our electronic wheel balancer.

FIG. 6 shows an arrangement for an operator's panel for our electronic wheel balancer. Controls 33 and 34 are set by the operator to provide the balancer with rim diameter and width data, respectively. These controls are adjusted prior to the start of a balancing procedure. The wheel is then rotated by the spindle 5 and indicators 17a, 17b, 17c, 17a', 17b', 17c' will display the positions on the wheel rim flanges at which one each of the balance weights should be placed. With 72 evenly-spaced positions on guage member 6, the placement of balance weights as indicated on display indicators 17a', 17b', and 17c' in FIG. 6 is shown in FIG. 2. It should be appreciated that the displays may differ slightly depending on the particular embodiment being used.

It should be further appreciated that there are other ways than those already discussed for determining when two balance weights will be insufficient to properly counter-balance a particular wheel, necessitating the use of a third balance weight at the position corresponding to signal POS. For example, knowing the total moment required to achieve a balance condition, the moment available from two of said balance weights placed at the POS position may be compared thereto. If the two balance weights when placed in such location cannot provide at least the required moment, a third balance weight will be required. In order to make a more practical calculation which includes a factor accounting for the physical dimensions of the balance weights and recognizing that two weights should not be required to overlap, the required moment could be compared to the moment which would be developed by 1.8 or 1.9 times the mass of a balance weight. It is believed that apparatus for making such determinations would be readily apparent to one familiar with the design of electronic systems.

The processing and apparatus are exactly the same with respect to balancing the wheel in the second plane B as they were for balancing in plane A. Accordingly, in order to avoid undue repetition, no further explanation of balancing in plane B is necessary and no more will be given.

While we have described our wheel balancing apparatus and method with respect to only one plane, and have provided figures illustrating an application to balancing in two planes, it should be appreciated that the dimensions and structure of the wheel to be balanced will determine in how many planes balance weights should be attached to the wheel. Thus, for some wheels, balancing in a single plane may be all that is required. In other circumstances, balancing in more than two planes may be required. For conventional vehicle wheels, it has been the general practice in the prior art to balance the wheel in two planes.

It should also be appreciated that our invention is applicable to the balancing of wheels of all types and is not limited to vehicle wheels or to wheel assemblies made up of a separate tire and wheel rim. The system and method we describe would, for example, be suitable for balancing flywheels, rotating machine parts, high-speed gears, shafts, and so forth.

Although some particular embodiments of the invention have been described and illustrated herein, it is recognized that modifications, variations, and alternate embodiments may readily occur to those skilled in the art without departing from the spirit of the invention. Thus, it is intended that all such modifications and equivalents to the preferred embodiment are covered by the appended claims.

We claim:

1. In a system for counter-balancing wheels by using balance weights of a single, pre-selected mass, the system having means for providing a pair of electrical signals, the first signal of such pair representing the angular location on the wheel, at a pre-selected radius, at which a weight of a magnitude sensed by said means should be placed to develop a counter-balancing moment in the direction required in order to balance the wheel, and the second signal of such pair representing the magnitude of the sensed weight which, if placed at said angular location, will develop a counter-balancing moment needed to balance the wheel, the improvement comprising:
   a. electronic means for receiving said pair of electrical signals;
   b. electronic processing means for converting said pair of electrical signals into electrical balancing position signals representing at least two locations on said wheel at said pre-selected radius at which one each of said balance weights should be affixed to said wheel to counter-balance said wheel; and
   c. means for visually displaying said locations at which the balance weights should be affixed.

2. A system for counter-balancing wheels are defined in claim 1, further including means for relating the information displayed on said visual display means to angular positions on the wheel.

3. A system for counter balancing wheels as defined in claim 2 wherein said means for relating the visual display information to angular positions on the wheel includes indicia representing increments of angular position on the wheel.

4. A system for counter balancing wheels as defined in claim 2, wherein said means for relating said visual display information to said angular positions on the wheel comprises a gauge member surrounding said wheel and having a plurality of positions arcuately spaced about said wheel.

5. A system for counter-balancing wheels by using balance weights of a single, pre-selected mass, comprising:
   a. means for rotating the wheel;
   b. means for providing a pair of electrical signals, the first signal of such pair representing the angular location at a pre-selected radius on the wheel at which a weight of a magnitude sensed by said means should be placed to develop a counter-balancing moment in the direction required in order to balance the wheel, and the second signal of such pair representing the magnitude of the sensed weight which, if placed at said angular location, will develop a counter-balancing moment needed to balance the wheel;
   c. means for producing an electrical signal representing the quotient of the magnitude of the sensed weight represented by the second signal of said pair of signals divided by twice the mass of a balance weight;
   d. means for obtaining an electrical signal representing the angle whose cosine is given by said quotient;
   e. means for adding the signal representing said angle to the first signal of said pair of signals, whereby a first balancing position signal is provided;
   f. means for subtracting the signal representing said angle from the first signal of said pair of signals, whereby a second balancing position signal is provided; and
   g. means for visually displaying said first and second balancing position signals.

6. A system for counter-balancing vehicle wheels as defined in claim 5, further including means for relating the information provided by said visual display means to angular positions on said wheel.

7. A system for counter balancing vehicle wheels as defined in claim 5, further including means for determining when an out-of-balance condition cannot be corrected by the attachment of two balance weights to the wheel.

8. A system for counter-balancing wheels by using balance weights of a single, pre-selected mass, the balance weights to be affixed to said wheel in a plurality of parallel planes situated perpendicularly to the axis of rotation of the wheel, comprising means for rotating the wheel and, for each plane:
   a. means for providing a pair of electrical signals, the first signal of each pair representing the angular location at a pre-selected radius on the wheel at which a weight of a magnitude sensed by said means should be placed to develop a counter-balancing moment in the direction required in order to balance the wheel, and the second signal of such pair representing the magnitude of the sensed weight which, if placed at said angular location, will develop a counter-balancing moment needed to balance the wheel;
   b. means for producing an electrical signal representing the quotient of the magnitude of the sensed weight divided by twice the mass of a balance weight;
   c. means for obtaining an electrical signal representing the angle whose cosine is given by said quotient;
   d. means for adding the signal representing said angle to the first signal of said pair of signals, whereby a first balancing position signal is provided;
   e. means for subtracting the signal representing said angle from the first signal of said pair of signals whereby a second balancing position is provided; and
   f. means for visually displaying said first and second balancing position signals.

9. A system for counter-balancing wheels as defined in claim 8 further including means for relating the information provided by said visual display means to angular positions on said wheel.

10. A system for counter-balancing wheels as defined in claim 9 wherein said means for relating the visual display information to angular positions on the wheel includes indicia representing increments of angular position on the wheel.

11. A system for counter-balancing wheels by using balance weights of a single, pre-selected mass, the wheel to be balanced having a wheel rim, said wheel rim having first and second flanges which, respectively, define first and second planes in which said balance weights are to be attached to said wheel, the system comprising means for rotating the wheel and, for each of said first and second planes:
   a. means for providing a pair of electrical signals, the first signal of each such pair representing the angular location on the rim flange at which a weight of a magnitude sensed by said means should be placed to develop a counter-balancing moment in the direction required in order to balance the wheel and the second signal of such pair representing the magnitude of the sensed weight which, if placed at said angular location, will develop a counter-balancing moment needed to balance the wheel in the plane;
   b. means for producing an electrical signal representing the quotient of the magnitude of the sensed weight divided by twice the mass of a balance weight;
   c. means for obtaining an electrical signal representing the angle whose cosine is given by said quotient;
   d. means for adding the signal representing said angle to the first signal of said pair of signals, whereby a first balancing position signal is provided;
   e. means for subtracting the signal representing said angle from the first signal of said pair of signals whereby a second balancing position signal is provided; and
   f. means for visually displaying said first and second balancing position signals.

12. A system for counter-balancing wheels as defined in claim 11, wherein said wheels are vehicle wheels.

13. A system for counter-balancing wheels as defined in claim 11, the system further including means for relating the information displayed on said visual display means to angular positions on the wheel.

14. A system for counter-balancing wheels as defined in claim 13, wherein said means for relating the visual display information to angular positions on the wheel includes indicia representing increments of angular position on the wheel.

15. A system for counter-balancing vehicle wheels as defined in claim 11, said system further including, for each of said first and second planes, means for determining when the out-of-balance condition in a plane cannot be corrected by the attachment of two balance weights to the rim flange.

16. A system for counter-balancing vehicle wheels by using balance weights of a single, pre-selected mass, the wheel to be balanced having a wheel rim, said wheel rim having first and second flanges which, respectively, define first and second planes in which said balance weights are to be attached, the system comprising means for rotating the wheel, means for providing an electrical signal representing the quotient of the length of a balance weight divided by twice the radius of the wheel rim, being a first quotient signal; and, for each of said first and second planes:
   a. means for providing a pair of electrical signals, the first signal of such pair representing the angular location on the rim flange at which a weight should be placed to develop a counter-balancing moment in the direction required in order to balance the wheel and the second signal of such pair representing the magnitude of the weight which, if placed at said angular location, will develop the counterbalancing moment needed to balance the wheel in the corresponding plane;
   b. a latching, two-state, condition-responsive, controlled switch, said switch having first and second input terminals and an output terminal, the first input terminal being connected by the switch to the output terminal thereof in response to a control signal of a first type being applied thereto, defining a first state, and the second input terminal being connected by the switch to the output terminal thereof in response to a control signal of a second type being applied thereto, defining a second state, the switch latching in the second state upon the occurrence of a control signal of the second type and remaining in the second state until being reset;
   c. means for providing an electrical signal representing the second signal of the pair of signals less the weight value of a balance weight, being a compensated weight signal;
   d. the second signal of said pair of signals being provided to the first input terminal of the switch;
   e. the compensated weight signal being provided to the second input terminal of the switch;
   f. means for providing an electrical signal representing the output signal from the switch divided by twice the mass of a balance weight, being a second quotient signal;
   g. means for providing an electrical signal representing the angle whose cosine is given by said second quotient signal;
   h. means for comparing the signal representing said angle to said first quotient signal, whereby a control signal of the first type is generated in response to said angle being less than said first quotient signal and a control signal of the second type is generated in response to said angle being greater than or equal to said first quotient signal;
   i. means for adding the signal representing said angle to the first signal of said pair of signals, whereby a first balancing position signal is provided;
   j. means for subtracting the signal representing said angle from the first signal of said pair of signals, whereby a second balancing position signal is provided;
   k. means for visually displaying said first and second balancing position signals; and
   l. means for visually displaying the first signal of said pair of signals in response to a control signal of the second type.

17. A system for counter-balancing wheels by using balance weights of a single, pre-selected mass, the wheel to be balanced having a wheel rim, said wheel rim having first and second flanges which, respectively, define first and second planes in which said balance weights are to be attached, the system comprising means for rotating the wheel, means for providing an electrical signal representing the quotient of the length of a balance weight divided by twice the radius of the wheel rim, being a first quotient signal; and, for each of said first and second planes:
   a. means for providing a pair of electrical signals, the first signal of such pair representing the angular location on the rim flange at which a weight should be placed to devolop a counter-balancing moment in the direction required in order to balance the wheel and the second signal of such pair representing the magnitude of the weight which, if placed at said angular location, will devolop the counter-balancing moment needed to balance the wheel in the corresponding plane;

b. means for producing an electrical signal representing the quotient of the magnitude of the weight represented by the second signal of said pair of signals divided by twice the mass of a balance weight, being a second quotient signal;

c. means for obtaining an electrical signal representing the angle whose cosine is given by said second quotient signal;

d. means for comparing the signal representing said angle to said first quotient signal, whereby a display control signal is generated in response to the value of said angle being less than the value of said first quotient;

e. means for adding the signal representing said angle to the first signal of said of signals, whereby a first balancing position signal is provided;

f. means for subtracting the signal representing said angle from the first signal of said pair of signals, whereby a second balancing position signal is provided;

g. means for visually displaying said first and second balancing position signals; and h. means for generating a visual display in response to said display control signal, whereby an indication is given that a balanced weight should be placed at the location corresponding to the first signal of said pair of signals, and the system restarted.

18. A method for counter-balancing wheels by using balance weights of a single, pre-selected mass, the wheel to be balanced having a wheel rim, said wheel rim having first and second flanges which, respectively, define first and second planes in which said balance weights are to be attached, said method comprising:

a. rotating the wheel;

b. sensing, while the wheel is rotating, the angular location on each of said first and second rim flanges at which a weight should be placed to develop a counter-balancing moment in the direction required in order to balance the wheel;

c. sensing, while the wheel is rotating, the magnitude of the weight which, if placed at said angular location, will develop the counter-balancing moment needed to balance the wheel in the corresponding plane; and further, for each of said planes:

d. providing an electrical signal representing the quotient of said sensed weight magnitude divided by twice the mass of a balance weight;

e. providing an electrical signal representing the angle whose cosine is given by said quotient;

f. adding the signal representing said angle to the signal representing said sensed angular location, whereby a first balancing position signal is provided;

g. subtracting the signal representing said angle from the signal representing said sensed angular location, whereby a second balancing position signal is provided; and h. visually displaying said first and second balancing position signals.

19. The method of counter-balancing vehicle wheels as defined in claim 18, said method further including the step of attaching balance weights to said wheel at the positions indicated by said visual display means.

20. The method of counter-balancing vehicle wheels as defined in claim 18, wherein said method further includes, for each of said first and second planes, providing a visual indication when two balance weights of the pre-selected mass are insufficiently massive to develop the moment required to correct the out-of-balance condition of the wheel.

21. A method for counter-balancing vehicle wheels by using balance weights of a single, pre-selected mass, the wheel to be balanced having a wheel rim, said wheel rim having first and second flanges which, respectively, define first and second planes in which said balance weights are to be attached, the method comprising:

a. rotating the wheel;

b. sensing, while the wheel is rotating, the angular location on each of said first and second rim flanges at which a weight should be placed to develop a counter-balancing moment in the direction required in order to balance the wheel;

c. sensing, while the wheel is rotating, the magnitude of the weight which, if placed at said angular location, will devolop the counter-balancing moment needed to balance the wheel in the corresponding plane; and further, for each of said planes;

d. providing an electrical signal representing the quotient of the length of a balance weight divided by twice the radius of the wheel rim flange, being a first quotient signal;

e. providing an electrical signal representing said sensed weight magnitude less the mass of a balance weight, being a compensated weight signal;

f. providing an electrical signal representing the quotient of the sensed weight magnitude divided by twice the mass of the balance weight, being a second quotient signal representing the cosine of the angular displacement at which said balance weights should be attached to said wheel rim relative to said sensed angular location;

g. providing an electrical signal representing the angle whose cosine is given by said second quotient signal;

h. comparing said angle signal to said first quotient signal and providing a first comparison signal in response to said angle signal being greater than said first quotient signal, and a second comparison signal in response to said angle being less than or equal to said first quotient signal;

i. providing, in rsponse to said second comparison signal, an electrical signal representing the quotient of the compensated weight signal divided by twice the mass of a balance weight, being a third quotient signal;

j. providing, in response to said second comparison signal, an electrical signal representing the angle whose cosine is given by said third quotient signal, being a second angle signal;

k. in response to said first comparison signal, adding said angle signal to said sensed angular location signal to provide a first balancing position signal, and subtracting said angle signal from said sensed angular location signal, providing a second balancing positioned signal;

l. in response to said second comparison signal, adding said second angle signal to said angular location signal, providing a first balancing position signal, and subtracting said second angle signal from said sensed angular location signal providing a second balancing position signal; and m. visually displaying said first and second balancing position signals and said angular location signal.

22. A method for counter-balancing wheels by using balance weights of a single, pre-selected mass, the wheel to be balanced having a wheel rim defining a plane in which said balance weights are to be attached, said method comprising:
   a. rotating the wheel;
   b. sensing, while the wheel is rotating, the angular location on said rim at which a weight should be placed to develop a counter-balancing moment in the direction required in order to balance the wheel;
   c. sensing, while the wheel is rotating, the magnitude of the weight which, if placed at said angular location, will develop the counter-balancing moment needed to balance the wheel in said plane;
   d. providing a pair of electrical signals representing as the first signal the angular location on said wheel and as the second signal the sensed weight magnitude;
   e. converting said pair of electrical signals into electrical balancing position signals representing at least two locations on said wheel at which one each of said balance weights should be affixed to said wheel to counter-balance said wheel; and
   f. visually displaying said locations at which the balance weights should be affixed.

* * * * *